US012595580B2

(12) United States Patent
Tsuchimoto et al.

(10) Patent No.: US 12,595,580 B2
(45) Date of Patent: Apr. 7, 2026

(54) GALVANIZED STEEL SHEET

(71) Applicant: JFE Steel Corporation, Tokyo (JP)

(72) Inventors: Kazuaki Tsuchimoto, Tokyo (JP);
Kento Watanabe, Tokyo (JP); Takeshi Matsuda, Tokyo (JP); Yoichi Makimizu, Tokyo (JP); Katsuya Hoshino, Tokyo (JP); Wataru Baba, Tokyo (JP); Taiyo Asakawa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 83 days.

(21) Appl. No.: 18/837,976

(22) PCT Filed: Nov. 16, 2022

(86) PCT No.: PCT/JP2022/042602
§ 371 (c)(1),
(2) Date: Aug. 13, 2024

(87) PCT Pub. No.: WO2023/162371
PCT Pub. Date: Aug. 31, 2023

(65) Prior Publication Data
US 2025/0198035 A1      Jun. 19, 2025

(30) Foreign Application Priority Data

Feb. 22, 2022      (JP) ................................. 2022-025361

(51) Int. Cl.
*C25D 5/48*          (2006.01)
*B32B 15/01*          (2006.01)
(Continued)

(52) U.S. Cl.
CPC .............. *C25D 3/22* (2013.01); *B32B 15/013* (2013.01); *B32B 2307/54* (2013.01);
(Continued)

(58) Field of Classification Search
CPC .. B32B 15/013; C25D 5/48; Y10T 428/12799
See application file for complete search history.

(56) References Cited

U.S. PATENT DOCUMENTS 5,629,099 A      5/1997  Sakurai et al.

FOREIGN PATENT DOCUMENTS

| CN | 102947476 A | 2/2013 |
| JP | H05331663 A | * 12/1993 |

(Continued)

OTHER PUBLICATIONS

English translation of JP05331663 Nov. 15, 2025 (Year: 2025).*

(Continued)

*Primary Examiner* — Adam Krupicka
(74) *Attorney, Agent, or Firm* — Buchanan Ingersoll & Rooney PC

(57)          ABSTRACT
A galvanized steel sheet is disclosed. The galvanized steel sheet has an arithmetic average roughness Ra of a surface of the steel sheet of 0.5 μm to 2.5 μm, and has concave and convex portions on the surface thereof, in which there are flattened portions in the convex portions, in which the number of valleys between the convex portions having a valley width of 0.1 mm or more and a maximum depth of 2.0 μm or more is 50 or more and less than 100 per 25 mm on a straight line, and in which, in the flattened portions in the convex portions, the number of concave and convex portions having a height difference of 0.3 μm or more is less than 20 per 2.5 mm on a straight line.

9 Claims, 3 Drawing Sheets

(51) Int. Cl.
     *C25D 3/22*        (2006.01)
     *C22C 18/00*       (2006.01)

(52) U.S. Cl.
     CPC ........... *B32B 2311/20* (2013.01); *C22C 18/00*
                     (2013.01); *C25D 5/48* (2013.01); *Y10T*
                                       *428/12799* (2015.01)

(56)                  References Cited

FOREIGN PATENT DOCUMENTS

| | | | |
|---|---|---|---|
| JP | H06333591 | A | 12/1994 |
| JP | H0718402 | A | 1/1995 |
| JP | H0754163 | A | 2/1995 |
| JP | H07-084674 | B2 | 9/1995 |
| JP | 2003171775 | A | 6/2003 |
| JP | 2003-306759 | A | 10/2003 |
| JP | 2004276064 | A | 10/2004 |
| JP | 4349149 | B2 | 10/2009 |
| JP | 2018016861 | A | 2/2018 |

OTHER PUBLICATIONS

Int'l Search Report (PCT/ISA/210) w/ translation & Written Opinion (PCT/ISA/237) mailed on Jan. 31, 2023, by the Japanese Patent Office in Int'l App. No. PCT/JP2022/042602. (8 pages).
Extended European Search Report issued Nov. 6, 2025, by the European Patent Office in corresponding European Patent Application No. 22928888.1-1103. (11 pages).

\* cited by examiner

GALVANIZED STEEL SHEET

CROSS REFERENCE TO RELATED APPLICATIONS

This is the U.S. National Phase application of PCT/JP2022/042602, filed Nov. 16, 2022, which claims priority to Japanese Patent Application No. 2022-025361, filed Feb. 22, 2022, the disclosures of these applications being incorporated herein by reference in their entireties for all purposes.

FIELD OF THE INVENTION

The present invention relates to a galvanized steel sheet which is excellent in terms of slidability when press forming is performed and, in particular, to a high strength galvanized steel sheet which is excellent in terms of press formability.

BACKGROUND OF THE INVENTION

An electrogalvanized steel sheet such as a zinc electroplated steel sheet, a zinc alloy electroplated steel sheet, or the like is widely used in a wide range of fields of industrial applications including automotive body applications and is used by being subjected to press forming in such applications. However, the electrogalvanized steel sheet is inferior to a cold rolled steel sheet in terms of press formability. This is because the sliding resistance in a press forming die of the electrogalvanized steel sheet is larger than that of the cold rolled steel sheet. That is, since it is difficult for the electrogalvanized steel sheet to enter the press forming die in a portion in which sliding resistance with the forming die and a bead is large, there is a problem in that fracturing tends to occur in the steel sheet.

In particular, in the case of a pure zinc-based plated steel sheet represented by a zinc electroplated steel sheet, since there is a phenomenon (referred to as "die galling") in which there is a further increase in sliding resistance as a result of the plated film adhering to the forming die, for example, cracking occurs in the middle of a continuous press forming process, which results in a serious negative effect on automobile productivity.

Moreover, from the viewpoint of tightened $CO_2$ emission regulations nowadays, there is a trend toward increasing the usage ratio of a high strength steel sheet for the purpose of reducing vehicle body weight. In the case where a high strength steel sheet is used, since there is an increase in surface pressure when press forming is performed, adhesion of the plated film to the forming die becomes a more serious issue to be addressed.

To improve the press formability of a galvanized steel sheet, a galvanized steel sheet having a zinc phosphate-based film formed on the surface thereof is proposed in Patent Literature 1 and Patent Literature 2 and has been put into practical use.

Patent Literature 3 describes that, as a method for improving the press formability of a zinc electroplated steel sheet having no zinc phosphate-based film, controlling the arithmetic average roughness Ra of the surface of the steel sheet and a parameter expressing the regularity of the surface roughness of the steel sheet to be within specified ranges is effective.

PATENT LITERATURE

PTL 1: Japanese Unexamined Patent Application Publication No. 2003-171775

PTL 2: Japanese Unexamined Patent Application Publication No. 2018-16861

PTL 3: Japanese Unexamined Patent Application Publication No. 63-33591

SUMMARY OF THE INVENTION

However, in the case of the techniques according to Patent Literature 1 and Patent Literature 2, since it is necessary to form a zinc phosphate-based film on the surface of the galvanized layer, there is an increase in manufacturing costs. Moreover, since it is also necessary to solve the problems regarding phosphorus emission regulations, there are many restrictions on production.

In the case of the technique according to Patent Literature 3, a galvanized steel sheet which is mainly used for the outer panel of an automotive body is provided with regularity in the surface roughness profile to obtain good deep drawability. Specifically, convex portions are regularly arranged on the surface of the steel sheet. It is known that, since automotive parts have complex shapes, sliding conditions vary in accordance with the kind of the part and with the position in one part. On the other hand, nowadays, a high strength galvanized steel sheet having a tensile strength of 440 MPa or higher is widely used for automotive applications. In the case where the high strength galvanized steel sheet is subjected to press forming, since a compressing surface pressure in a contact portion between the steel sheet and the forming die is higher than in the case of a mild steel sheet, excellent slidability under a high surface pressure is required. However, there is no mention of sliding resistance in Patent Literature 3. Therefore, the technique according to Patent Literature 3 is not a technique which provides the high strength galvanized steel sheet with satisfactory press formability under a wide range of conditions.

As described above, in the case of the techniques according to Patent Literature 1 and Patent Literature 2, although lubrication performance is realized due to the lubrication effect of the zinc phosphate-based film, there are problems regarding manufacturing cost and manufacturing technique. In the case of the technique according to Patent Literature 3, it is not possible to provide the high strength galvanized steel sheet with satisfactory press formability under a wide range of conditions.

In addition, in the case where the steel sheet which is subjected to press forming so as to be used in practical use is required to have good surface appearance to be used for, for example, automotive body applications and the like, it is also necessary that there be no defect such as variation in after-painting surface appearance or the like.

Aspects of the present invention have been completed in view of the situation described above, and an object of aspects of the present invention is to provide a galvanized steel sheet having excellent press formability with which it is possible to appropriately inhibit die galling, which causes cracking to occur in a formed product when press forming is performed, without forming a lubrication film such as a zinc phosphate-based film or the like. In addition, an object of aspects of the present invention is to provide a galvanized steel sheet which has good after-painting surface appearance in the case where the steel sheet is painted before use after press forming has been performed.

The present inventors diligently conducted investigations to solve the problems described above and, as a result, found that, by controlling the surface profile of a galvanized steel sheet to be a specified shape, it is possible to achieve excellent press formability and good after-painting surface appearance without forming a zinc phosphate-based film on the surface of the galvanized layer.

Specifically, by performing rolling or the like, the surface roughness of a steel sheet before galvanizing is adjusted in such a manner that the arithmetic average roughness Ra of the surface is 0.6 μm to 3.5 μm, and the number of valleys between convex portions having a valley width of 0.1 mm or more and a maximum depth of 2.5 μm or more is 50 or more and less than 100 per 25 mm on a straight line on the surface of the steel sheet. Subsequently, galvanizing is performed. Since the galvanized layer grows fundamentally on the surface of the base steel sheet, there are concave and convex portions having a height difference of the order of μm therebetween due to the concave and convex portions on the surface of the steel sheet before galvanizing. After galvanizing, flattened portions having small roughness are formed by performing rolling or the like on the convex portions of the concave and convex portions in such a manner that the number of concave and convex portions having a height difference of 0.3 μm or more is adjusted to be less than 20 per 2.5 mm on a straight line on the surface of the steel sheet in the flattened portion. In addition, it was found that, by performing such rolling or the like to adjust the arithmetic average roughness Ra of the surface of the steel sheet to be 0.5 μm to 2.5 μm and the number of valleys between the convex portions having a valley width of 0.1 mm or more and a maximum depth of 2.0 μm or more to be 50 or more and less than 100 per 25 mm on a straight line on the surface of the steel sheet, it is possible to manufacture a galvanized steel sheet having excellent press formability. Regarding a method for adjusting the surface profile of the galvanized steel sheet to be within the ranges described above, performing rolling in such a manner that the surface roughness of the rolling rolls and the rolling reduction conditions are adjusted is effective.

The reason why the number of the valleys between the convex portions having a valley width of 0.1 mm or more and a maximum depth of 2.0 μm or more is adjusted to be 50 or more and less than 100 per 25 mm on a straight line is for the purpose of improving press forming oil retention capability when press forming is performed.

The reason why the flattened portions are formed in the convex portions of the concave and convex portions in such a manner that the number of concave and convex portions having a height difference of 0.3 μm or more is adjusted to be less than 20 per 2.5 mm on a straight line on the surface of the steel sheet in the flattened portion is for the purpose of increasing the area of contact between the steel sheet and a forming die when press forming is performed, thereby decreasing a surface pressure. Due to the combined effect of the formation of the flattened portions in the convex portions and the adjustment of the number of the concave and convex portions to be less than the specified number, the press formability becomes good.

In the case of the conventional galvanized layer, there is a problem in that, since the galvanized layer adheres to a forming die, and since the soft zinc-based film is elongated so as to eliminate the concave and convex portions on the surface of a forming die, there is a further increase in the frictional coefficient due to a lubricant oil shortage, which causes die galling. It is considered that, in accordance with aspects of the present invention, by forming flattened portions in the convex portions to decrease contact resistance, and by forming valleys having a depth equal to or more than a specified value at a density equal to or higher than a specified value to inhibit the lubrication oil shortage, it is possible to inhibit an increase in the frictional coefficient.

Regarding the galvanized steel sheet, the effects according to aspects of the present invention are realized most in the case where a zinc electroplated steel sheet is used. This is because the zinc electroplated film is the type of galvanized film which is softest and most likely to cause die galling.

In the case of a zinc-nickel alloy plated film, which is harder than a zinc electroplated film, although die galling is less likely to occur than in the case of a zinc electroplated steel sheet, die galling may occur during use for a part which requires a higher degree of forming or during use for a steel sheet having higher strength. In the case of the zinc-nickel alloy plated steel sheet, which is used as a steel sheet for automotive body applications in many cases because of its excellent corrosion resistance, the application effect according to aspects of the present invention is particularly large.

Regarding the base steel sheet of the galvanized steel sheet according to aspects of the present invention, a high strength steel sheet having a tensile strength of 440 MPa or higher can preferably be used. This is because, during press forming of the high strength steel sheet having a tensile strength of 440 MPa or higher, whose forming load is larger, as a result, die galling of the galvanized steel sheet is more likely to occur than in the case of a no-high-strength steel sheet, so that the effects according to aspects of the present invention are likely to be realized.

Moreover, in the case of a high strength steel sheet, that is, a galvanized steel sheet in which a base steel sheet has a tensile strength of 980 MPa or higher, whose forming load is further increased when press forming is performed, since die galling is more likely to occur than in the case of a high strength steel sheet having a tensile strength of 440 MPa or higher and lower than 980 MPa, the effects according to aspects of the present invention are realized more significantly.

Aspects of the present invention have been completed on the basis of the knowledge described above, and are as follows.

[1] A galvanized steel sheet, in which an arithmetic average roughness Ra of a surface of the steel sheet is 0.5 μm to 2.5 μm, in which the steel sheet has concave and convex portions on the surface thereof, in which there are flattened portions in the convex portions, in which the number of valleys between the convex portions having a valley width of 0.1 mm or more and a maximum depth of 2.0 μm or more is 50 or more and less than 100 per 25 mm on a straight line, and in which, in the flattened portions in the convex portions, the number of concave and convex portions having a height difference of 0.3 μm or more is less than 20 per 2.5 mm on a straight line.

[2] The galvanized steel sheet according to item [1] above, in which a galvanized layer is a zinc electroplated layer.

[3] The galvanized steel sheet according to item [1] above, in which a galvanized layer is a zinc-nickel alloy electroplated layer containing zinc, 10 mass % to 15 mass % of nickel, and unavoidable impurities.

[4] The galvanized steel sheet according to any one of items [1] to [3] above, in which a base steel sheet has a tensile strength of 440 MPa or more.

[5] The galvanized steel sheet according to any one of items [1] to [3] above, in which a base steel sheet has a tensile strength of 980 MPa or more.

According to aspects of the present invention, since there is a significant decrease in the frictional coefficient between a steel sheet and a forming die or the like, it is possible to obtain a steel sheet excellent in terms of press formability. Consequently, it is possible to stably provide excellent press formability to a steel sheet which has comparatively low strength and which is subjected to complex forming.

In addition, also in the case of a high strength steel sheet having higher surface pressure during press forming, the sliding resistance in a portion at risk of cracking occurring during press forming is reduced, so that a galvanized steel sheet having excellent press formability can be obtained in a portion in which a surface pressure is so high that die galling is assumed to occur.

Incidentally, in accordance with aspects of the present invention, the expression "high strength" denotes a case of a tensile strength (TS) of 440 MPa or higher, and the expression "comparatively low strength" denotes a case of a TS of lower than 440 MPa.

BRIEF DESCRIPTION OF THE DRAWINGS

FIG. 1($b$) is an example of a graph drawn by superimposing a cross-sectional roughness profile and a curve obtained by averaging the cross-sectional roughness profile.

DETAILED DESCRIPTION OF EMBODIMENTS OF THE INVENTION

Figure 1:
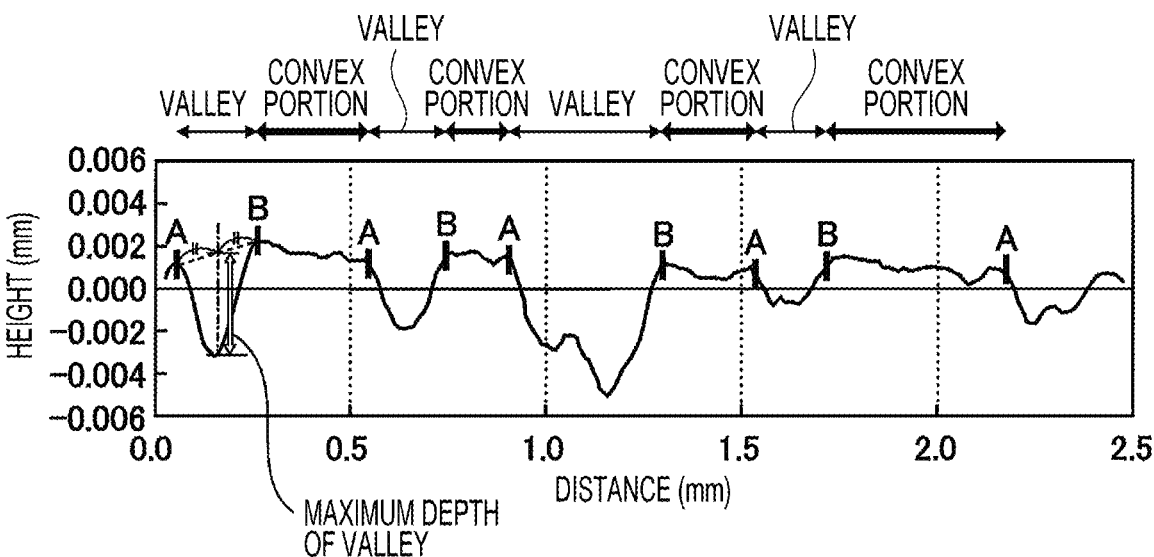
FIG. 1($a$) is an example of a curve obtained by averaging a cross-sectional roughness profile.
Figure 1:
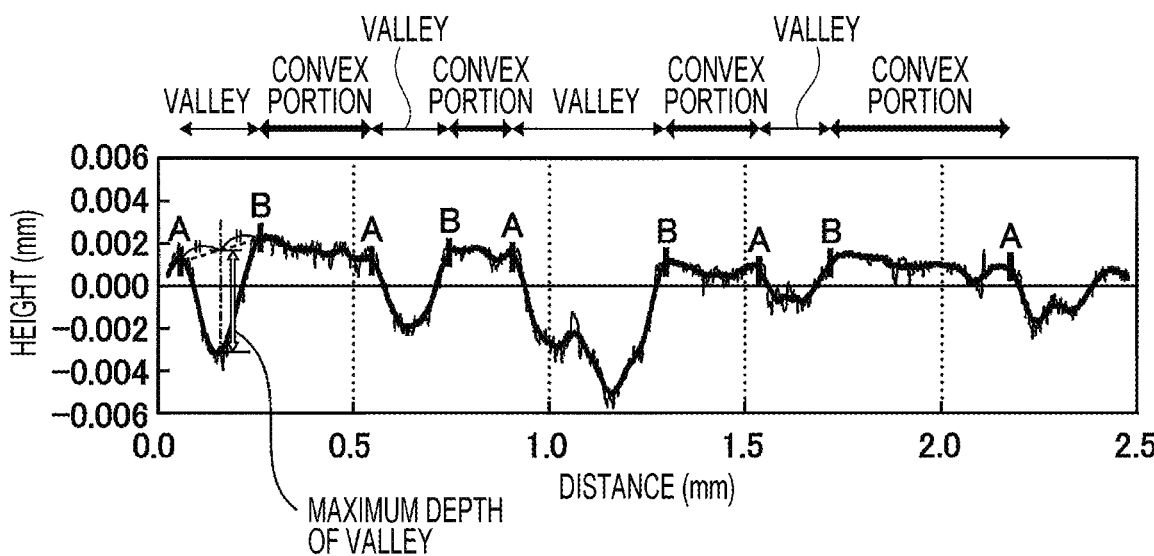

Hereafter, the embodiments of the present invention will be described.

One embodiment of the present invention is a galvanized steel sheet having a galvanized film layer on at least one surface of a steel sheet.

Although there is no limitation on the chemical composition or mechanical properties of a base steel sheet to be subjected to galvanizing, the effects according to aspects of the present invention are particularly significant in the case of a high strength steel sheet having a tensile strength of 440 MPa or higher. The effects according to aspects of the present invention are further significant in the case of a high strength steel sheet having a tensile strength of 980 MPa or higher.

Here, the term "galvanized steel sheet" denotes zinc-based plated steel sheets in general. "Galvanized steel sheet" is a generic term used to refer to a so-called pure zinc plated steel sheet, which has a zinc plated film to which a metal element or the like is not intentionally added, a zinc-alloy plated steel sheet, which has a plated film containing metal elements such as iron, nickel, and the like in addition to zinc, a zinc-based composite plated steel sheet, which has a plated film containing compounds such as silica, alumina, and the like in addition to zinc, and the like. In general, a zinc plated film usually contains, as plating impurities, unavoidable impurities such as elements (Fe and other components in steel) eluted from the steel sheet, impurities (Ni, Sn, Al, and the like) mixed into the film from apparatuses such as a cell and the like which are also used for other types of plating. Therefore, the meaning of "galvanized steel sheet" includes a zinc plated steel sheet which has a zinc plated film containing such constituents.

In addition, there is no particular limitation on the method used for forming a galvanized layer, and any one of an electroplating method and a hot-dip plating method may be used. However, it is preferable that an electroplating method, which ensures stable surface quality, be used.

In particular, a zinc electroplated steel sheet widely used as the galvanized steel sheet is preferably used, because this realizes the effects according to aspects of the present invention significantly. In addition, it is preferable that a zinc-nickel alloy electroplated layer, which contains zinc, 10 mass % to 15 mass % of nickel, and unavoidable impurities and which is particularly excellent in terms of corrosion resistance in automotive applications, be used, because this makes the effects according to aspects of the present invention useful.

Although there is no particular limitation on the coating weight of the galvanized layer, the coating weight is generally set to be 20 g/m$^2$ to 100 g/m$^2$. There is insufficient corrosion resistance in the case of a coating weight of less than 20 g/m$^2$, and there is an increase in manufacturing costs in the case of a coating weight of more than 100 g/m$^2$.

In accordance with aspects of the present invention, the surface roughness of the galvanized steel sheet is controlled to be within the specified range. That is, it is necessary that the arithmetic average roughness Ra, which is determined in accordance with the prescription in JIS B 0601-2001, be 0.5 μm or more and 2.5 μm or less. In the case where Ra is less than 0.5 μm, there is an increase in the frictional coefficient. In the case where Ra is more than 2.5 μm, there is a deterioration in after-painting surface appearance due to the height difference of the concave and convex portions on the surface of the steel sheet being excessively large. To control the surface roughness to be within the range described above, adjusting the surface roughness of the steel sheet before plating is performed by rolling is effective. To control the surface roughness after rolling has been performed to be within the range described above, performing rolling in such a manner that the surface roughness of the rolling rolls and the conditions of rolling reduction are adjusted is effective.

In addition, it is necessary that concave and convex portions be formed on the surface of the galvanized steel sheet in such a manner that the number of valleys between the convex portions having a valley width of 0.1 mm or more and a maximum depth of 2.0 μm or more is 50 or more and less than 100 per 25 mm on a straight line. In the case where the valley width is less than 0.1 mm or the maximum valley depth is less than 2.0 μm, since it is not possible to retain a sufficient amount of lubricating oil, an increase in the frictional coefficient cannot be suppressed. In the case where the number of the valleys is less than 50 per 25 mm, since it is not possible to retain a sufficient amount of lubricating oil, an increase in the frictional coefficient cannot be suppressed. In the case where the number of the valleys is 100 or more per 25 mm, since the area of the convex portions decreases, there is a decrease in the area of contact between the steel sheet and the forming die, which results in an increase in the frictional coefficient. To form the valleys described above, adjusting the surface roughness of the steel sheet before plating is performed by rolling is effective.

In addition, there are naturally concave and convex portions having a height difference of the order of μm therebetween on the surface of the galvanized steel sheet, and it is necessary that, after galvanizing has been performed, flattened portions be formed in the convex portions of the concave and convex portions in such a manner that, in the flattened portions, the number of concave and convex portions having a height difference of 0.3 μm or more is less than 20 per 2.5 mm on a straight line. This is related to the smoothness of the surface of the flattened portions in the convex portions. In the case where the number of the valleys per 2.5 mm is more than 20, since the roughness of the surface of the flattened portions in the convex portions increases, the load is locally concentrated during sliding, which results in an increase in the frictional coefficient. There is no particular limitation on the lower limit of the number of the concave and convex portions having a height difference of 0.3 μm or more in the flattened portions in the convex portions, and the number may be 0 per 2.5 mm on a straight line. Even in the case where the number of such valleys is about 5 per 2.5 mm on a straight line, there is only a small increase in the frictional coefficient. Therefore, the number of the concave and convex portions having a height difference of 0.3 μm or more may be set to be about 5 or more per 2.5 mm on a straight line from the viewpoint of decreasing the frequency of roll surface repair.

By adjusting the surface roughness of the rolling rolls, which are used when skin pass rolling is performed on the steel sheet before plating, so as to have an Ra of 5.0 μm or more and a PPI of 50 to 150 with a height reference of ±0.635 μm, it is possible to form concave and convex portions in such a manner that the number of valleys between the convex portions having a valley width of 0.1 mm or more and a maximum depth of 2.0 μm or more is 50 or more and less than 100 per 25 mm on a straight line. With this, it is preferable that the surface roughness Ra of a steel sheet before galvanizing is adjusted to be 0.6 μm to 3.5 μm and that the number of valleys between convex portions having a valley width of 0.1 mm or more and a maximum depth of 2.5 μm or more be adjusted to be 50 or more and less than 100 per 25 mm on a straight line on the surface of the steel sheet.

To form the flattened portions in the convex portions of the concave and convex portions on the surface of the galvanized steel sheet, it is preferable that rolling be performed on the steel sheet after galvanizing has been performed. By using bright rolls having a surface roughness Ra of 0.3 μm or less as the rolling rolls, and by adjusting the rolling load to be 20 kgf/mm² or higher, it is possible to form the flattened portions in the convex portions. In the case of a zinc-nickel alloy plated layer, by adjusting the rolling load after plating has been performed to be 25 kgf/nm² or higher, it is possible to form the flattened portions in the convex portions.

EXAMPLES

Hereafter, aspects of the present invention will be described in accordance with examples. Here, the present invention is not limited to the examples below.

A hot rolled steel sheet having a thickness of 2.8 mm was subjected to pickling followed by cold rolling so as to be made into a cold rolled steel sheet having a thickness of 0.8 mm. Moreover, the cold rolled steel sheet having a thickness of 0.8 mm was subjected to annealing, then skin pass rolling was carried out to form specified concave and convex portions, subjected to electroplating, and then subjected to a treatment to form flattened portions on the surface thereof. In the skin pass rolling, the surface profile was adjusted by adjusting the type and surface conditions of the rolling rolls and rolling load under the conditions given in the column "Rolling Condition before Plating" in Table 1. Electroplating was carried out in a sulfuric acid bath of pH1.5 containing zinc ions in an amount of 1.5 mol/L at a current density of 50 A/dm² with the steel sheet being set at the cathode to form a galvanized layer having a specified coating weight. Subsequently, flattened portions were formed in the convex portions of the galvanized surface layer under the conditions given in the column "Rolling Condition after Plating" in Table 1.

In addition, the cold rolled steel sheet having a thickness of 0.8 mm was similarly subjected to skin pass rolling to form specified concave and convex portions, subjected to zinc-nickel alloy electroplating (nickel content: 12 mass %), and subjected to a treatment to form flattened portions on the surface thereof. In the skin pass rolling, the surface profile was adjusted by adjusting the type and surface conditions of the rolling rolls and rolling load under the conditions given in the column "Rolling Condition before Plating" in Table 1. Electroplating was performed in a sulfuric acid bath of pH1.5 containing zinc ions in an amount of 0.4 mol/L and nickel ions in an amount of 0.9 mol/L at a current density of 50 A/dm² with the steel sheet being set at the cathode to form a zinc-nickel alloy plated layer having a specified coating weight. Subsequently, flattened portions were formed in the convex portions of the zinc-nickel alloy plated surface layer under the conditions given in the column "Rolling Condition after Plating" in Table 1.

The galvanized steel sheets obtained as described above were evaluated as described below.

(1) Surface Roughness Measurement

The surface roughness was determined by using a cross-sectional roughness profile measured in accordance with JIS B 0601-2001. Analysis was performed with a cutoff wavelength A of 0.8 mm. The measurement direction was the rolling direction of the steel sheets. The tracer used had a conical tip shape, a point angle of 60°, and a tip radius of 2 μm. The measurement length was 4 mm. By averaging the roughness profile by using the method described below, the number of valleys having a valley width of 0.1 mm or more and a maximum vertical depth from a straight line connecting the peaks on both sides of the valley of 2.0 μm or more was counted. The number of peaks having a height of 0.3 μm or more was similarly analyzed with a cutoff wavelength λ of 0.8 mm. The determined value was defined as the average of the measured values at ten randomly selected positions.

Here, when the roughness profile is averaged in such a manner that the height of a point on the curve obtained by averaging the roughness profile is the average height of the roughness profile in a region (having a width of 0.05 mm) on the horizontal axis from the point located −0.025 mm from the relevant point to the point located 0.025 mm from the relevant point, the convex portion is defined on the basis of the averaged roughness profile in such a manner that the height of the point in the convex portion is larger than the average height of the measurement range (a measurement length of 4 mm) and the average rate of change in height in a region (having a width of 0.05 mm) on the horizontal axis from the point located −0.025 mm from the relevant point to the point located 0.025 mm from the relevant point is within a range of ±20 μm/mm by converting the value into that per 1 mm in the distance on the horizontal axis. FIG. 1(a) illustrates the curve obtained by averaging the roughness profile as described above. In FIG. 1(a), a point A and a point B respectively denote the ending point and starting point of the convex portion, and a region from the point B to the point A which extends from left to right is defined as the convex portion. In the averaged roughness profile as described above, the valley is defined as a portion which exists in a region from the point A to the point B extending from left to right, which includes at least a region lower than the point A, and which is lower than the straight line connecting the point A and the point B. In addition, in the averaged roughness profile, the valley width is defined as a distance on the horizontal axis of the valley, that is, the region defined as described above, and the depth of the valley is calculated as the difference between the average value of the heights of both end points of the valley and the height of the lowest point of the valley.

The number of the minute concave and convex portions in the convex portion is defined as the total number of peaks and valleys, which have an unaveraged height of +0.3 μm or more or −0.3 μm or less with respect to the averaged roughness profile, in the convex portion existing between the point B and the point A described above. That is, as illustrated in FIG. 1(b), when the curve obtained by averaging the roughness profile and the unaveraged roughness profile are superimposed, in one stroke, which is defined as a stroke from a point having an unaveraged height of +0.3 μm or more with respect to the averaged roughness profile to a nearest point having an unaveraged height of −0.3 μm or less with respect to the averaged roughness profile, the number of fine concave and convex portions is defined as two in total with one peak and one valley. That is, even in the case where plural peaks having a height of +0.3 μm or more with respect to the averaged roughness profile are recognized, the number of peaks is defined as one until a valley having a height of −0.3 μm or less with respect to averaged roughness profile is recognized. In addition, even in the case where plural valleys having a height of −0.3 μm or less with respect to the averaged roughness profile are recognized, the number of valleys is defined as one until a peak having a height of +0.3 μm or more with respect to the averaged roughness profile is recognized.

Incidentally, in a state before rolling is performed by using the bright rolls, since the flattened portions are not formed, the convex portions do not have a flattened shape but have a shape which is convex upward. In this case, by comparing the above-described curve obtained by averaging the roughness profile and the average height straight line of the roughness profile, a portion higher than the average height straight line is defined as a convex portion, and a portion lower than the average height straight line is defined as a concave portion. The valley width is defined as a distance between intersections with the average height straight line, and the depth of the valley is defined as a distance between the average height straight line and the lowest point.

(2) Frictional Coefficient Measurement

Figure 2:
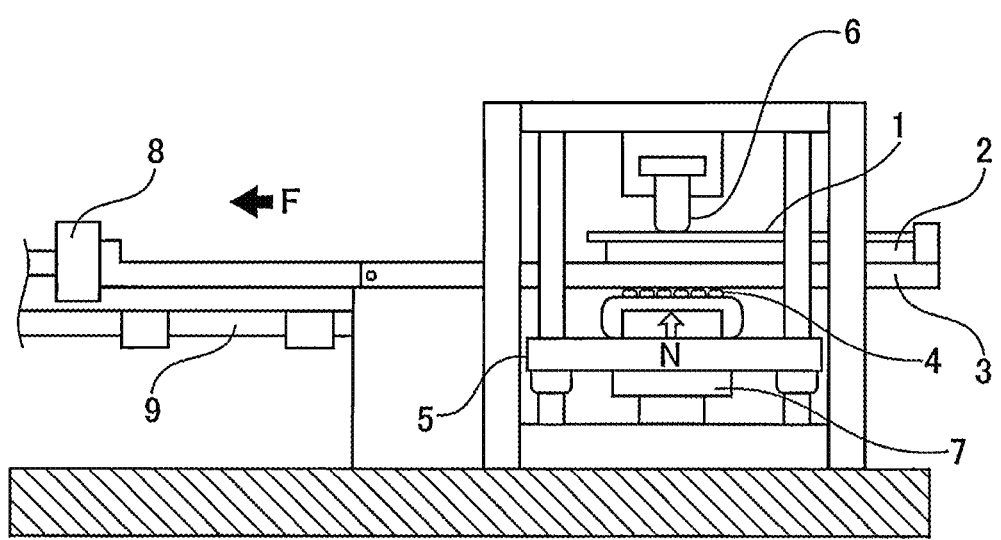
FIG. 2 is a schematic front view illustrating a frictional coefficient measurement apparatus.

To evaluate press formability, the frictional coefficient of each of the sample materials was measured as described below. FIG. 2 is a schematic diagram illustrating a frictional coefficient measurement apparatus which was used. In this apparatus, a sample for frictional coefficient measurement 1, which was taken from the sample material, is fixed to a sample stage 2, and this sample stage 2 is fixed to the upper surface of a horizontally movable slide table 3. Below the slide table 3, a vertically movable slide table-supporting base 5, which has rollers 4 that contact the lower surface of the slide table 3, is disposed and a first load cell 7 is fixed to the slide table-supporting base 5 to measure compressing load N between a bead 6 and the sample for frictional coefficient measurement 1, which is generated by pushing up the slide table-supporting base 5. A second load cell 8 is fixed to one of the edges of the slide table 3 to measure a sliding resistance force F, which is generated by horizontally moving the slide table 3 while the above-described compressing force is applied. Here, regarding a lubrication oil, a wash oil for rust prevention "PRETON (registered trademark) R352L" produced by Sugimura Chemical Industrial Co., Ltd. was applied to the surface of the sample 1 when the test was performed.

Figure 3:
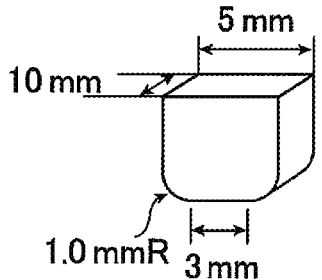
FIG. 3 and FIG. 4 are schematic perspective views illustrating the shapes and sizes of the bead in FIG. 2.
Figure 4:
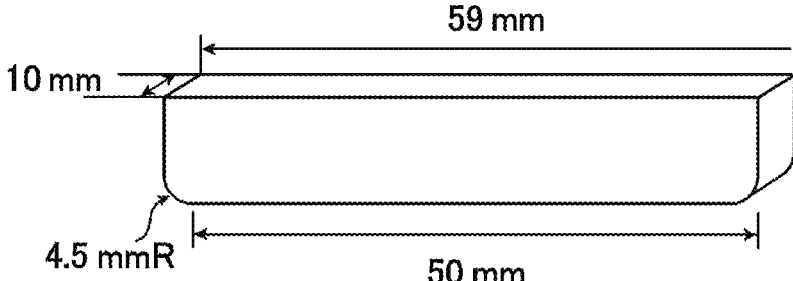

FIG. 3 and FIG. 4 are perspective views illustrating the shapes and sizes of the beads which were used. Sliding is performed while the lower surface of the bead 6 is compressed onto the surface of the sample 1.

The bead 6 illustrated in FIG. 3 has a width of 10 mm, a length in the sliding direction on the sample of 5 mm, curved surfaces having a radius R of curvature of 1.0 mm on the lower edges of both edges in the sliding direction, and a lower flat surface, which is compressed onto the sample and which has a width of 10 mm and a length in the sliding direction of 3 mm.

The bead 6 illustrated in FIG. 4 has a width of 10 mm, a length in the sliding direction on the sample of 59 mm, curved surfaces having a radius R of curvature of 4.5 mm on the lower edges of both edges in the sliding direction, and a lower flat surface, which is compressed onto the sample and which has a width of 10 mm and a length in the sliding direction of 50 mm.

Frictional coefficient measurement was performed under the three conditions described below.

[Condition 1]

The bead illustrated in FIG. 3 was used, the compressing load N was 400 kgf, and the sample drawing speed (horizontal moving speed of the slide table 3) was 100 cm/min. These conditions were set on the basis of the assumption of an entrance at which there is a high surface pressure and high sliding speed such as a position through which a bead passes.

[Condition 2]

The bead illustrated in FIG. 3 was used, the compressing load N was 800 kgf, and the sample drawing speed (horizontal moving speed of the slide table 3) was 100 cm/min.

Since these conditions include a higher surface pressure than that under Condition 1, it is possible to evaluate press formability in the case where a high-strength galvanized steel sheet is subjected to press forming.

[Condition 3]

The bead illustrated in FIG. 4 was used, the compressing load N was 400 kgf, and the sample drawing speed (horizontal moving speed of the slide table 3) was 20 cm/min. These conditions were set on the basis of the assumption of a position at which a contact surface area is comparatively large such as the shoulder part of a punch and a punch surface through which a material passes in drawing or the like.

The frictional coefficient μ between the bead and the sample material was calculated by using the equation $\mu=F/N$. The smaller the frictional coefficient μ, the better the evaluation of press formability. Under Condition 1, a case of a μ of 0.160 or less was judged as pass. Under Condition 2, a case of a μ of 0.150 or less was judged as pass. Under Condition 3, a case of a μ of 0.250 or less was judged as pass.

(3) Surface Appearance Evaluation after Painting

For simulation of a process for manufacturing automotive body parts, after having performed common alkaline degreasing followed by surface conditioning, the sample was immersed in a phosphating solution "PB-L3065" produced by Nihon Parkerizing Co., LTD. for 2 minutes. Subsequently, an electrodeposition coating film having a thickness of 25 μm was formed by using "V-50" produced by Nippon Paint Co., Ltd. (bath temperature: 28° C. to 30° C.). Surface appearance evaluation was made in accordance with the following criteria.

○: no apparent variation in surface appearance is recognized x: apparent variation in surface appearance is recognized in 50% or more of the surface area of the sample

TABLE 1

| No | Sample Material | Tensile Strength (MPa) | Roll Type | Roll Surface Roughness Ra (μm) | PPI | Load per Unit Width (tonf/mm) | Plating Type | Coating Weight (g/m²) | Roll Type | Roll Surface Roughness Ra (μm) | Load per Unit Width (kgf/mm) |
|---|---|---|---|---|---|---|---|---|---|---|---|
| 1 | Cold Rolled Steel Sheet | 270 | Shot | 2.8 | 120 | 0.4 | Zn | 50 | Bright | 0.2 | 20 |
| 2 | Cold Rolled Steel Sheet | 440 | Electro-discharge | 7.4 | 100 | 1.0 | Zn | 50 | Bright | 0.2 | 20 |
| 3 | Cold Rolled Steel Sheet | 1470 | Electro-discharge | 7.4 | 100 | 1.0 | Zn | 50 | Bright | 0.2 | 50 |
| 4 | Cold Rolled Steel Sheet | 440 | Electro-discharge | 7.4 | 100 | 1.0 | Zn—Ni | 50 | Bright | 0.2 | 25 |
| 5 | Cold Rolled Steel Sheet | 780 | Electro-discharge | 7.4 | 100 | 0.8 | Zn | 20 | Bright | 0.2 | 20 |
| 6 | Cold Rolled Steel Sheet | 780 | Electro-discharge | 5.0 | 140 | 0.6 | Zn | 50 | Bright | 0.2 | 20 |
| 7 | Cold Rolled Steel Sheet | 980 | Electro-discharge | 5.0 | 140 | 0.6 | Zn—Ni | 50 | Bright | 0.2 | 35 |
| 8 | Cold Rolled Steel Sheet | 980 | Electro-discharge | 5.0 | 140 | 0.6 | Zn | 50 | Bright | 0.2 | 35 |
| 9 | Cold Rolled Steel Sheet | 1180 | Electro-discharge | 7.4 | 100 | 1.0 | Zn | 50 | Bright | 0.2 | 40 |
| 10 | Cold Rolled Steel Sheet | 1470 | Electro-discharge | 7.4 | 100 | 1.0 | Zn | 20 | Bright | 0.2 | 50 |
| 11 | Cold Rolled Steel Sheet | 1470 | Electro-discharge | 7.4 | 100 | 1.0 | Zn—Ni | 50 | Bright | 0.2 | 50 |
| 12 | Cold Rolled Steel Sheet | 440 | Electro-discharge | 7.4 | 100 | 1.0 | Zn | 50 | — | — | — |
| 13 | Cold Rolled Steel Sheet | 440 | Electro-discharge | 9.5 | 80 | 1.0 | Zn | 50 | Bright | 0.2 | 20 |

| No | Flattening | Ra (μm) | Number of Valleys between Convex Portions Having a Valley Width of 0.1 mm or More and a Maximum Depth of 2.0 μm or More per 2.5 mm on Straight Line Number/25 mm | Number of Concave and Convex Portions Having a Height Difference of 0.3 μm or More Number/2.5 mm | Friction Test Condition 1 | Condition 2 | Condition | After-Painting Variation | |
|---|---|---|---|---|---|---|---|---|---|
| 1 | o | 0.7 | 40 | 21 | 0.166 | 0.155 | 0.324 | o | Comparative Example |
| 2 | o | 1.0 | 80 | 17 | 0.135 | 0.122 | 0.203 | o | Example |
| 3 | o | 1.2 | 90 | 15 | 0.119 | 0.110 | 0.195 | o | Example |
| 4 | o | 1.1 | 90 | 13 | 0.125 | 0.115 | 0.161 | o | Example |
| 5 | o | 1.0 | 70 | 10 | 0.126 | 0.122 | 0.172 | o | Example |
| 6 | o | 0.8 | 65 | 11 | 0.131 | 0.125 | 0.201 | o | Example |
| 7 | o | 0.9 | 70 | 12 | 0.116 | 0.111 | 0.155 | o | Example |
| 8 | o | 0.9 | 70 | 11 | 0.119 | 0.111 | 0.194 | o | Example |
| 9 | o | 1.0 | 90 | 13 | 0.117 | 0.112 | 0.191 | o | Example |
| 10 | o | 1.2 | 85 | 15 | 0.113 | 0.109 | 0.177 | o | Example |
| 11 | o | 1.1 | 90 | 16 | 0.120 | 0.112 | 0.151 | o | Example |
| 12 | x | 1.1 | 85 | 28 | 0.176 | 0.169 | 0.368 | o | Comparative Example |
| 13 | o | 2.6 | 60 | 16 | 0.160 | 0.149 | 0.180 | x | Comparative Example |

As indicated in Table 1, any one of the steel sheets of the examples of the present invention has excellent press formability and after-painting surface appearance. In contrast, any one of the steel sheets of the comparative examples, which do not have the technical features according to aspects of the present invention, is poor in terms of press formability or after-painting surface appearance.

INDUSTRIAL APPLICABILITY

Since the steel sheet according to aspects of the present invention is excellent in terms of press formability and after-painting surface appearance, it is possible to use the steel sheet in a wide field of industrial applications including automotive body applications.

REFERENCE SIGNS LIST 1. sample for frictional coefficient measurement
2. sample stage
3. slide table
4. roller
5. slide table-supporting base
6. bead
7. first load cell
8. second load cell
9. rail
N. compressing load
F. sliding resistance force

The invention claimed is:

1. A galvanized steel sheet, wherein an arithmetic average roughness Ra of a surface of the steel sheet is 0.5 μm to 2.5 μm, wherein the steel sheet has concave and convex portions on the surface thereof, wherein there are flattened portions in the convex portions, wherein a number of valleys between the convex portions having a valley width of 0.1 mm or more and a maximum depth of 2.0 μm or more is 50 or more and less than 100 per 25 mm on a straight line, and wherein, in the flattened portions in the convex portions, a number of concave and convex portions having a height difference of 0.3 μm or more is less than 20 per 2.5 mm on a straight line.

2. The galvanized steel sheet according to claim 1, wherein a galvanized layer is a zinc electroplated layer.

3. The galvanized steel sheet according to claim 1, wherein a galvanized layer is a zinc-nickel alloy electroplated layer containing zinc, 10 mass % to 15 mass % of nickel, and unavoidable impurities.

4. The galvanized steel sheet according to claim 1, wherein a base steel sheet has a tensile strength of 440 MPa or more.

5. The galvanized steel sheet according to claim 2, wherein a base steel sheet has a tensile strength of 440 MPa or more.

6. The galvanized steel sheet according to claim 3, wherein a base steel sheet has a tensile strength of 440 MPa or more.

7. The galvanized steel sheet according to claim 1, wherein a base steel sheet has a tensile strength of 980 MPa or more.

8. The galvanized steel sheet according to claim 2, wherein a base steel sheet has a tensile strength of 980 MPa or more.

9. The galvanized steel sheet according to claim 3, wherein a base steel sheet has a tensile strength of 980 MPa or more.

\* \* \* \* \*